June 11, 1929.  A. A. POLLOCK  1,717,256
SHIP PROPULSION
Original Filed July 17, 1923
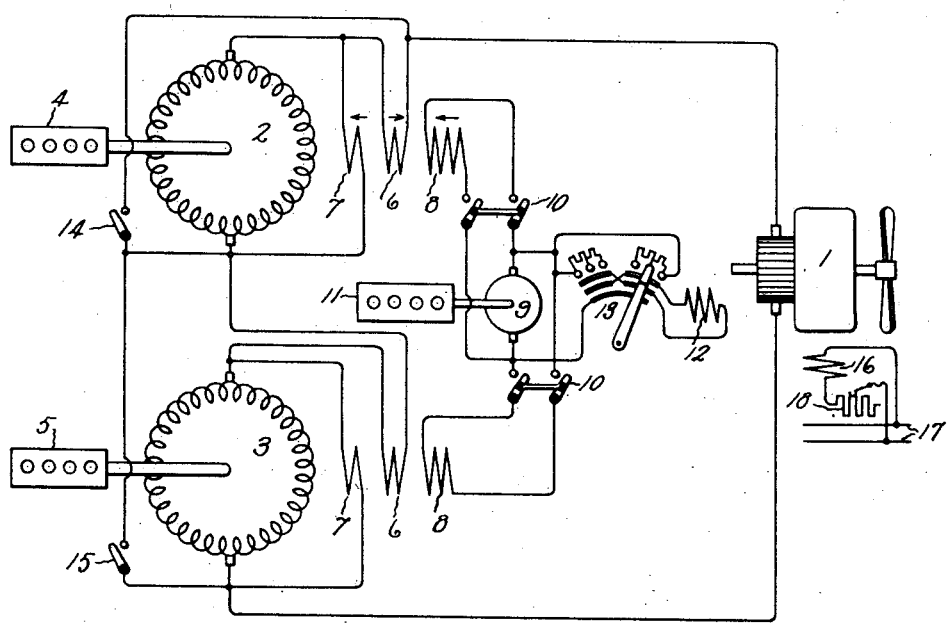
Inventor:
Alan A. Pollock,
by *Alexander S. ____*
His Attorney.

Patented June 11, 1929.

1,717,256

UNITED STATES PATENT OFFICE.

ALAN ADAIR POLLOCK, OF LEAMINGTON SPA, ENGLAND, ASSIGNOR TO GENERAL ELECTRIC COMPANY, A CORPORATION OF NEW YORK.

SHIP PROPULSION.

Original application filed July 17, 1923, Serial No. 652,195, and in Great Britain December 2, 1922. Divided and this application filed March 19, 1925. Serial No. 16,755.

My invention relates to systems of electric ship propulsion wherein a propeller motor is supplied with current from a plurality of direct current generators driven by Diesel engines or other prime movers subject to variations in speed and driving torque, and has for its object the provision of an improved arrangement for preventing stalling or reversal of a prime mover when its torque is decreased and the generator to which it is coupled tends to operate as a motor.

As explained in my copending application, Serial Number 652,195, filed July 17, 1923, of which the present application is a division, the generators in systems of this character are commonly connected in series so as to insure satisfactory division of the propeller load between the different engines which may be running at one time, the number of engines running being varied according to the speed at which it is desired to drive the ship. If there are four engines, for example, each generator may be wound for 200 volts, thus making available a total of 800 volts with the four generators in series. If it is desired to run at approximately three-fourths full speed, the system may be operated at 400 volts with two of the generators idle. Under these conditions the two remaining engines may be run on full load by weakening the field of the motor, thus securing maximum economy. A Ward Leonard control is usually provided for varying the speed of the propeller from full speed in one direction to standstill and full speed in the reverse direction with all the engines running.

For excitation of the main generators and also for lighting and auxiliary appliances on the ship, it has been found convenient to provide auxiliary generators. When the generator excitation is supplied from a constant voltage source, failure of one or more cylinders of the engine of a main generator may result in reversal of this engine by the torque of the generator which is likely to be supplied with current from the other generators and to operate as a motor under these conditions. In accordance with my invention, this difficulty is obviated by the provision of an arrangement comprising a generator field winding connected to the generator terminals.

In addition to a separately excited winding and the winding connected across the generator terminals I also provide a differential series field which functions to give a drooping characteristic to the system, to reduce load fluctuations on the engines as the torque varies due to sea conditions, for in rough weather when the speed of the ship relative to the weather varies widely, owing to large waves, if the speed of the propeller is maintained constant the driving torque will also vary widely. It is, however, not desirable to make the drooping characteristic excessive.

My invention will be better understood from the following description when considered in connection with the accompanying drawing and its scope will be pointed out in the appended claim.

Referring to the drawing, the single figure thereof shows an electric ship propulsion system in which my invention has been embodied.

This system comprises a propeller motor 1 arranged to be supplied with current from main generators 2 and 3 which are connected in series to the motor 1 and are coupled to the prime movers 4 and 5 respectively. Each of the generators is provided with a series field winding 6 connected in the load circuit of the system, a self-excited shunt field winding 7 connected to the main generator terminals, and a separately-excited field winding 8 arranged to be supplied with current from an exciting machine 9 through a switch 10. As indicated by arrows, the series winding 6 is arranged to produce a flux opposed to the fluxes of windings 7 and 8. The exciter 9 may be driven in any suitable manner, as by a prime mover 11 for example, and is shown as provided with a self-excited field winding 12 which is connected to the exciter terminals through a reversing controller 13. Switch 14 is provided for short circuiting the generator 2 when it is desired to operate the motor by current supplied from the generator 3. A like switch 15 is provided for short circuiting the generator 3 when the load current of the system is supplied from the generator 2. The motor 1 is provided with a field winding 16 which is arranged to be supplied with current from a suitable source through leads 17 and adjustable resistor 18.

The operation of the system will be readily understood without detailed explanation. Assuming the torque of prime mover 4 to decrease, the speed and voltage of the generator 2 will immediately decrease; the excitation of the generator field winding 7 will decrease in a manner to produce a further decrease in the generator voltage; and the output of the generator 2 will be reduced sufficiently to enable the engine 4 to drive it even though some of the engine cylinders fail to operate. The system described thus has the great advantage that the generator is enabled to operate at reduced torque, reversal of the generator prime mover upon failure of one or more of its cylinders to function being prevented by decrease in generator speed and excitation. At the same time due to the winding 6, engine 4 is protected against load fluctuations that may result due to variations in the driving torque of the propeller.

The embodiment of the invention illustrated and described herein has been selected for the purpose of clearly setting forth the principles involved. It will be apparent, however, that the invention is susceptible of being modified in some respects to meet different conditions encountered in its use and I therefore aim to cover by the appended claim all modifications within the true spirit and scope of my invention.

What I claim as new and desire to secure by Letters Patent of the United States is:—

An electric ship propulsion system comprising a propeller motor, a plurality of direct current generators driven by prime movers subject to variations in their speeds and driving torques and arranged to be connected in series with one another for supplying current to said motor, a separately excited field winding for each of said generators, a differential series field winding for each of said generators, and a self excited field winding acting in the same sense as the separately excited field winding for each of said generators.

In witness whereof I have set my hand this 16th day of February, 1925.

ALAN ADAIR POLLOCK.